United States Patent [19]

Shimizu

[11] Patent Number: 5,907,005

[45] Date of Patent: *May 25, 1999

[54] VARNISH COMPOSITION

[75] Inventor: Itsuo Shimizu, Ichihara, Japan

[73] Assignee: Chisso Corporation, Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/841,824

[22] Filed: Apr. 28, 1997

Related U.S. Application Data

[63] Continuation of application No. 08/409,044, Mar. 23, 1995, abandoned.

[30] Foreign Application Priority Data

Mar. 25, 1994 [JP] Japan .................................. 6-077907

[51] Int. Cl.$^6$ ............................... C08K 5/34; C08K 5/20; C08K 5/10
[52] U.S. Cl. ........................ 524/104; 524/106; 524/233; 524/234; 524/315; 524/361; 524/378
[58] Field of Search ................................... 524/104, 106, 524/233, 234, 315, 361, 378

[56] References Cited

U.S. PATENT DOCUMENTS

| | | | |
|---|---|---|---|
| 4,073,788 | 2/1978 | Peterson | 427/120 |
| 4,309,321 | 1/1982 | Aihara et al. | |
| 5,517,341 | 5/1996 | Kim et al. | 359/59 |
| 5,521,035 | 5/1996 | Wolk et al. | 430/20 |

*Primary Examiner*—Kriellion S. Morgan
*Attorney, Agent, or Firm*—Leydig, Voit & Mayer

[57] ABSTRACT

A varnish composition suitable for producing a liquid crystal aligning film having a thickness of several tens to one hundred nanometers having 1 to 10% by weight of polyamic acid or soluble polyimide, and 90 to 99% by weight of a solvent which comprises 5 to 80% by weight of at least one compound selected from a group of solvent components A and 20 to 95% by weight of at least one compound selected from a group consisting of component B and component C where the group of solvent components A consists of N-methyl-2-pyrrolidone and dimethylimidazolidinone and the component B is alkyl lactate, and the component C is $$R_{1-O(C_3H_6O)_nH} \tag{I}$$

where n is 1 or 2, $R_1$ is an alkyl group having 4 carbon atoms when n is 1, and $R_1$ is an alkyl group having 1 to 4 carbon atoms when n is 2, is disclosed.

8 Claims, No Drawings

VARNISH COMPOSITION

This application is a continuation of patent application Ser. No. 08/409,044, filed Mar. 23, 1995 now abandoned.

BACKGROUND OF THE INVENTION

FIELD OF THE INVENTION

The present invention relates to new varnish compositions containing polyamic acid or soluble polyimide useful for a film which controls alignment of liquid crystals, a liquid crystal color filter or its protecting film, more specifically, it relates to varnish compositions improving coating properties, coating uniformity, aging, toxicity, flammability or the like.

DESCRIPTION OF THE PRIOR ART

Liquid crystal elements, which are characterized by low voltage drive, low consumption of electric power, small thickness, and the like, have been used for display devices such as clocks, watches, electronic calculators, TV, word processors and personal computers. These elements are going to have various uses.

Techniques have been developed in various fields such as cell substrates, spacers, light sources, driving technology, liquid crystal materials, display modes, sealing materials, color filters, electrode technology and aligning films, and excellent liquid crystal display elements are obtained by concurrently developing these techniques. However, there are many problems. In the field of aligning films, there are problems such as coating properties (repellency) of the aligning films, small tilt angles, unstable tilt angles, aligning disorder, chemically unstable varnish, and organic solvents having poor safety.

The aligning films are classified into organic aligning films and inorganic aligning films. In general, organic aligning films are used because these films are suitable for line production. In these organic aligning films, polymer films of polyimide types having excellent heat resistance, alignment controlling properties, electrical properties, film stability, and the like are used for practical reasons.

However, when liquid crystal elements are used in various technical fields, it is required to obtain display elements having good display quality and aligning agents having good workability. Aligning agents, which include polyimide films for liquid crystal elements, are usually used as a solution of polyamic acid. In general non-protonic organic solvents, such as N-methyl-2-pyrrolidone (abbreviated as NMP hereinafter), are used for the synthesis of polyamic acid. However, when using these solvents with aligning agents or varnish, it is difficult to form thin films having a uniform film thickness since such varnish is easily repelled upon coating. For the purpose of improvement of the application, it is tried to combine cellosolve type solvents (usually butyl cellosolve is used), organopolysiloxane compounds, or fluorine type surfactant compounds with the solvents.

SUMMARY OF THE INVENTION

An object of the present invention is to improve varnish coating properties and another object of the present invention is to improve the uniformity of a coating film thickness. The reason is that, as described below, repellency is sometimes observed in solvents such as NMP/butyl cellosolve (abbreviated as BC hereinafter) which are used frequently. In addition, when a coating is evaluated, the coating thickness of liquid crystal display elements is not uniform even if there is no repellency. If the coating thickness of liquid crystal display elements is not uniform, there is a problem that uneven display easily occurs.

The third object relates to reduction of the toxicity of the solvents used. Since conventionally used solvents of the cellosolve type are poisonous, their use is limited and prescribed by rules such as Labor Safety Rule or Preventive Rule of Organic Solvent Poisoning. It is important to provide a safe working environment by using a solvent having little toxicity.

The fourth object relates to improvement of polyamic acid type varnish having unstable viscosity. Namely, when NMP and BC used as regular solvents are combined, there are problems that potlife of the varnish is influenced by the combination of such solvents, and that the varnish viscosity changes with time. As shown in a comparative example, in the combination of NMP and BC, there is a problem that the viscosity decreases to about 80% after the varnish is permitted to stand for one day. Hitherto, it has been little known to stabilize the viscosity of polyamic acid.

According to the present invention, the abovementioned problems can be solved separately or in combination.

The present invention provides the following varnish composition to solve the above problems.

Namely, the varnish composition of the present invention comprises polyamic acid or soluble polyimide (sometimes abbreviated as polyamic acids hereinafter) and a solvent, and the solvent contains at least one kind of compound selected from the group of solvent components A and at least one kind of compound selected from the components B and/or group of component C.

Component A: Non-protonic organic solvents as shown in the following;

NMP, N-methyl caprolactam, N-methyl propionamide, N,N-dimethylformamide, N,N-dimethylacetamide, dimethyl sulfoxide, N,N-diethylformamide, N,N-diethylacetamide, dimethyl imidazolidinone (abbreviated as DMI hereinafter) and γ-butyrolactone.

Component B:

Alkyl lactate (preferably butyl lactate), 3-methoxy-3-methyl butanol (abbreviated as MMB hereinafter), tetralin, decalin, isophorone and ethyl carbitol (abbreviated as ECA hereinafter).

Component C:

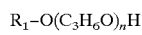

wherein n is 1 or 2; $R_1$ is alkyl having 4 carbon atoms when n is 1, and $R_1$ is alkyl having 1 to 4 carbon atoms when n is 2.

Further, when component B is alkyl lactate, $R_1$ is preferably alkyl having about 4 carbon atoms.

For example, 1) in combination of NMP or DMI as component A, butyl lactate, MMB and ECA as component B and/or component C, a varnish composition is provided having low toxicity and excellent coating properties. 2) When component A, includes isophorone and tetralin, a varnish is provided having low repellency and excellent coating properties. In addition, in the mixture of types 1) and 2), the coating properties are good. Further, it is possible to reduce the disadvantage of varnish potlife (viscosity change with time) which is found in combination of component A and a cellosolve type (BC and the like). Particularly, tetralin, butyl lactate, isophorone and the like have an effect on the stability of viscosity, and MMB and component C solvents also have better pot life as compared with cellosolve type solvents. When ECA is used as component B, the other component B and/or component C are preferably combined.

In the solubilities of polyamic acids, polyamic acids are more soluble in isophorone, MMB and ECA as compared with BC which is commonly used by a combination of component A. When varnish is stored at low temperatures, although the polymers are deposited on NMP/BC type solvents to solidify the varnish, they are uniformly soluble in NMP/isophorone or NMP/MMB type solvents in the same mixing proportion. Especially, isophorone gives excellent solubility to the varnish. Though the solubility of component C or butyl lactate is slightly lower than that of BC, it is possible to compensate for the disadvantages by using these solvents together with the above-mentioned solvents having good solubities.

Since the solvents used in the present invention have flash points of 60° C. or above, it is possible to use them safely without danger of flashing. Accordingly, there is high safety against static electricity. Particularly, when DMI or NMP is used as component A, the component may be constituted by the solvents having flash points of 70° C. or above.

Considering regulations in Japan, cellosolve type solvents which are commonly used, such as BC which is widely used, are regulated by the fire law, the labor safety and sanitary law (for the second class organic solvents), the dangerous object shipping and storage rule, the regulation relative to the application of the aviation law and the like to be controlled in transit. For the varnish of the present invention, many solvents such as NMP and DMI in component A, butyl lactate, ECA and MMB in component B and compounds in component C are practical to employ because they have low toxicity.

In solvent component A, NMP and DMI are preferable. These solvents have suitable boiling points, high flash points and comparatively little toxicity. The content of component A in the solvent mixture is preferably 5 to 80% by weight (% means % by weight hereinafter), more preferably 10 to 60%. If the concentration of component A is too high, there are problems in coating properties, and if it is less than 5%, there are problems in solubilities of polyamic acids. However, if polyamic acids are used in low concentration, these components are also suitable in low concentration. On the other hand, if polyamic acids are used in high concentration, the concentration of these components are selected in high concentration. The content of component B and/or component C in a solvent is suitably 20 to 95%, preferably 40 to 90%. When the content is less than 20%, there are problems of coating properties. On the other hand, when the content is more than 90%, particularly 95%, there are problems of polymer solubilities. Solvents other than the organic solvents used in the present invention are naturally contained in the varnish without any restriction of the advantages claimed for the present invention.

The concentration of polyamics is suitably 0.1 to 40%, preferably 1 to 10% for commonly used means of varnish coating (such as spin coating, print coating, dip coating and spray coating).

Polyamic acid of a polyimide precursor in the present invention has the following constitution unit:

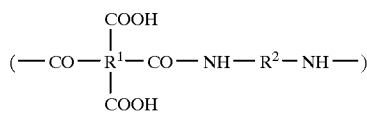

wherein $R^1$ is a quadiavalent alicyclic or aromatic hydrocarbon residue or a heterocyclic residue, in which substituting groups such as halogens can be contained, and $R^2$ shows a bivalent group mainly containing a hydrocarbon residue in which groups such as —O—, —S—, halogen and —CN can be contained. As such polyamic acids, there are tetracarbonic dianhydrides having an aromatic ring such as pyromellitic dianhydride or polyamic acids obtained by reaction of an alicyclic tetracarboxylic acid having a ring such as cyclobutane ring and a diamino compound.

Examples of such tetracarboxylic dianhydrides are aromatic tetracarboxylic acids such as pyromellitic dianhydride, 3,3',4,4'-biphenyl tetracarboxylic dianhydride, 2,2',3,3'-biphenyl tetracarboxylic dianhydride, 2,3,3',4'-biphenyl tetracarboxylic dianhydride, 3,3',4,4'-benzophenonetetra-carboxylic dianhydride, 2,3,3',4'-benzophenone-tetracarboxylic dianhydride, 2,2',3,3'-benzophenonetetra-carboxylic dianhydride, bis(3,4-dicarboxyphenyl)sulfone dianhydride, 1,2,5,6-naphthalene tetracarboxylic dianhydride and 2,3,6,7-naphthalene tetracarboxylic dianhydride, and alicyclic tetracarboxylic acids such as cyclobutane, cyclohexane, cyclooctane, bicyclooctane and the alicyclic tetracarboxylic acids mentioned in the following.

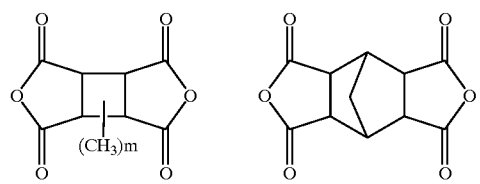

m is an integer of 1–4.

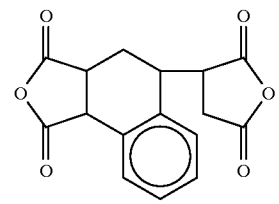

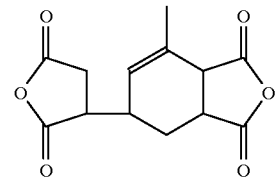

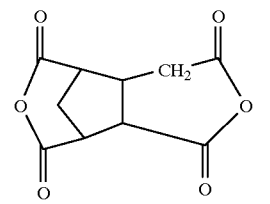

Diamino compounds include, for instance, aromatic diamino compounds such as
1,1-bis[4-(4-aminophenoxy)phenyl]cyclohexane,
1,1-bis[4-(4-aminophenoxy)phenyl]-4-methylcyclohexane,
1,1-bis[4-(4-aminophenoxy)phenyl]-4-ethylcyclohexane,
1,1-bis[4-(4-aminophenoxy)phenyl]-4-n propylcyclohexane,
1,1-bis[4-(4-aminophenoxy)phenyl]-4-n butylcyclohexane,
1,1-bis[4-(4-aminophenoxy)phenyl]-4-n pentylcyclohexane,
1,1-bis[4-(4-aminophenoxy)phenyl]-4-n hexylcyclohexane,
1,1-bis[4-(4-aminophenoxy)phenyl]-4-n pheptylcyclohexane,
1,1-bis[4-(4-aminophenoxy)phenyl]-4-octylcyclohexane.
2,2-bis[4-(4-aminophenoxy)phenyl]propane, 2,2-bis[4-(4-aminophenoxy)phenyl]butane,
2,2-bis[4-(4-aminophenoxy)phenyl]pentane,
2,2-bis[4-(4-aminophenoxy)phenyl]hexane,
2,2-bis[4-(4-aminophenoxy)phenyl]heptane,
2,2-bis[4-(4-aminophenoxy)phenyl]octane,
2,2-bis[4-(4-aminophenoxy)phenyl]nonane,
2,2-bis[4-)4-aminophenoxy)phenyl]decane,
2,2-bis[4-(4-aminophenoxy)phenyl]dodecane,
1,1-bis[4-(4-aminobenzyl)phenyl]cyclohexane,
1,1-bis[4-(4-aminobenzyl)phenyl]-4-methylcyclohexane,
1,1-bis[4-(4-aminobenzyl)phenyl]-4-ethylcyclohexane,
1,1-bis[4-(4-aminobenzyl)phenyl]-4-n propylcyclohexane,
1,1-bis[4-(4-aminobenzyl)phenyl]-4-n butylcyclohexane,
1,1-bis[4-(4-aminobenzyl)phenyl]-4-n pentylcyclohexane,
1,1-bis[4-(4-aminobenzyl)phenyl]-4-n hexylcyclohexane,
1,1-bis[4-(4-aminobenzyl)phenyl]-4-n heptylcyclohexane,
1,1-bis[4-(4-aminobenzyl)phenyl]-4-n octylcyclohexane,
1,1-bis[4-(4-aminobenzyl)phenyl]methane, aromatic diamino compounds such as 4,4'-diaminophenylether, 4,4'-diaminodiphenylmeta 4,4'-diaminodiphenylsulfone, 4,4'-diaminodiphenylsulfide, 4,4'-di(metaaminophenoxy) diphenylsulfone, 4,4'-(para-aminophenoxy)diphenylsulfone, ortho-phenylenediamine, meta-phenylenediamine, para-phenylenediamine, benzidine, 2,2'-diaminobenzophenone, 4,4'-diaminobenzophenone, 4,4'-diaminodiphenyl-2,2-propane, 1,5-diaminonaphthalene, 1,8-diaminonaphthalene, and 2,2-bis[4-(4-aminophenoxy) phenyl]hexamethylpropane, alicyclic diamino compounds such as 1,4-diaminocyclohexane and 4,4'-diaminodicyclohexylmethane. However, the tetracarboxylic dianhydride and diamino compounds used in the present invention are not limited to the above compounds.

Further, combination of two or more kinds of anhydrides and diamino compounds can be used in the present invention. It is also possible to apply the present invention to varnish of polyamic acid or a varnish of soluble polyamide-imide having the polyamic acid partially changed to imide.

DESCRIPTION OF THE PREFERRED EMBODIMENTS

The following examples and comparative examples illustrate the present invention more specifically. In these examples, % is indicated by weight.

Examples 1–8

1) Production of Mother Liquor 1

A flask of 300 ml equipped with a stirrer, a thermometer, a condenser and a nitrogen displacement apparatus was displaced with nitrogen, and then 85.8 ml of NMP which was purified by dehydration was placed into the flask. After adding 10.0 g of 2,2-bis[4-(4-aminophenoxy)phenyl]octane, the mixture was dissolved with stirring and ice-cooled at 5° C. After adding 5.2 g of pyromellitic dianhydride all at once, the mixture was reacted with stirring on cooling. After one hour, 1.14 g of para-aminophenyltrimethoxysilane was added, and the mixture was reacted with stirring for one hour at 10° C. to obtain about 100 cc of a 16% tansparent solution of polyamic acid comprising 8:7:1.8 by mole ratio of pyromellitic dianydride, 2,2-bis[4-(4-aminophenoxy)phenyl] octane and para-aminophenyltrimethoxysilane, respectively. The viscosity of the solution was about 1400 cps at 25° C. The transparent solution was called mother liquor 1.

2) Preparation of Sample Liquors

To portions of the above mother liquor 1, each solvent within the scope of the present invention was added to obtain the composition shown in Table 1 (the rest is polyamic acid). The mixture was mixed well to obtain sample liquors for evaluating the repellant properties and change of viscosity with time.

3) Evaluation of Repellency

A few drops of the sample liquor for an aligning agent prepared in 2) were put on a cleaned glass substrate. After spinning for ten seconds at a rotational speed of 3000 rpm, the substrate was allowed to stand at room temperature, and the repellant properties were evaluated by visual observation. The results are shown in Table 1.

The evaluation of repelling properties was conducted at a room humidity of 60%.

TABLE 1

| Example | Composition of organic solvents (% by weight) | | NMP | Repelling |
| | Compound Name | | | |
|---|---|---|---|---|
| 1 | Ethyl lactate | 60 | 33.6 | No |
| 2 | n-Butyl lactate | 60 | 33.6 | " |
| 3 | iso-Butyl lactate | 60 | 33.6 | " |
| 4 | iso-Amyl lactate | 60 | 33.6 | " |
| 5 | n-Butyl lactate + Diethylene glycol diethyl ether | 40/40 | 16.8 | " |
| 6 | Tetralin | 50 | 42 | " |
| 7 | Decalin | 50 | 42 | " |
| 8 | Tetralin + Butyl cellosolve | 10/40 | 42 | " |

Concentration of polyamic acid (%) = 100 − (Concentration of NMP + Concentration of other solvents Comparative Examples 1–8

Using the mother liquor 1 utilized in the above examples 1–8, organic solvents beyond the scope of the present invention are mixed as described above to evaluate the repellant properties. The results are shown in Table 2.

TABLE 2

| Comparative example | Composition of organic Solvents (% by weight) | | NMP | Repellant Properties |
| | Compound Name | | | |
|---|---|---|---|---|
| 1 | Ethylene glycol monoethyl ether | 60 | 33.6 | Remarkable |
| 2 | BC | 60 | 33.6 | " |
| 3 | Ethylene glycol iso-amyl ether | 60 | 33.6 | " |
| 4 | Ethylene glycol monohexyl ether | 60 | 33.6 | " |
| 5 | Diethylene glycol monomethyl ether | 60 | 33.6 | " |
| 6 | NMP | 60 | 33.6 | " |
| 7 | N,N-diethylformamide | 60 | 33.6 | " |
| 8 | N-methylpropionamide | 60 | 33.6 | " |

Examples 9–13

1) Production of Mother Liquor 2

A flask of 500 ml equipped with a stirrer, a thermometer, a condenser and a nitrogen displacement apparatus was displaced with nitrogen, and then 263.4 ml of DMI, which was purified by dehydration, was placed in the flask. After adding 31.66 g of 1,1-bis[4-(4-aminophenoxy)phenyl]-4-n pentylcyclohexane, the mixture was dissolved with stirring and ice-cooled at 5° C. in an ice bath. After adding 15.16 g of pyromellitic dianhydride all at once, the mixture was reacted with stirring on cooling for one hour and 30 minutes. Then, 3.36 g of para-aminophenyltrimethoxy-silane to obtain about 300 g of a 16% transparent solution of polyamic acid comprising 8:7:1.8 by mole ratio of pyromellitic dianhydride, 1,1-bis[4-(4-aminophetrimethoxysilane, respectively. The solution was called mother liquor 2.

2) Preparation of Sample Liquors

To portions of the above mother liquor 2, each organic solvent within the scope of the present invention was added to obtain the composition shown in Table 3. The mixture was mixed well to obtain sample liquors for evaluating the repellant properties and coating unevenness.

Evaluation of repellent properties and coating unevenness.

A few drops of sample liquors having the solvent concentration prepared in each example were put on a glass substrate having transparent electrodes of ITO (indium oxide) of about 25 mm×25 mm square. After spinning for ten seconds at a rotational speed of 2000 rpm, the coated substrate was dried on a hot plate at 50° C. to remove the solvent, and the repellant properties were evaluated as described above. Then, the substrate was heated at 200° C. for 90 minutes and the uniformity of polyimide film thickness on the glass substrate was observed. In a thin film, lack of uniformity of the film thickness is attended by interference color changes, so that the lack of uniformity may be observed by the color changes. Then, the color changes were evaluated as the lack of uniformity of the film thickness.

The results are shown in Table 3, these examples show that the organic solvents of the present invention have an effect on polyamic acid constituting mother liquor 2 from the repellant properties and have excellent coating uniformity.

TABLE 3

| Example | Compound name | Composition of organic solvents (% by weight) DMI | Repelling | Lack of uniformity |
|---|---|---|---|---|
| 9 | n-Butyl lactate | 60  33.6 | No | No |
| 10 | Isophorone | 60  33.6 | No | No |
| 11 | PGB | 50  44 | No | No |
| 12 | PGB + ECA | 30/20  44 | No | No |
| 13 | MMB | 50  44 | No | No |

PGB: propyleneglycol monobutylether (in formula (I), n is 1 and $R_1$ is an alkyl group having four carbon atoms.) (It is the same in the following tables).

Comparative Examples 9–12

Using the above mother liquor 2, sample liquors were mixed under the same conditions as in Example 11 except that organic solvents beyond the scope of the present invention were used, and the repellant properties and lack of uniformity of the coating were evaluated. The results are shown in Table 4.

TABLE 4

| Comparative example | Name of compound | Composition of organic solvents (% by weight) DMI | Repelling properties | Lack of uniformity |
|---|---|---|---|---|
| 9 | NMP | 44  50 | Remarkable | *1 |
| 10 | Ethyleneglycol-monohexyl ether | 44  50 | Remarkable | *1 |
| 11 | ECA | 44  50 | Found | Found*2 |
| 12 | Ethyleneglycol-monobutylacetate | 44  50 | No | Found*2 |

*1: There is remarkable repellant properties and no coating.
*2: There are complete mosaics having different colors.

Examples 14–19

To the above mother liquor 2, each organic solvent within the scope of the present invention was added to obtain the compositions shown in Table 5. The mixture was mixed well to obtain sample liquors for evaluating retention of viscosity.

The retention of viscosity was evaluated by the following method.

Namely, about 10 cc of each sample liquor was placed in a glass container of 20 cc and the sample was stored in a room controlled at a temperature of 25° C. and the oven controlled at a temperature of 35° C. The changes of viscosity were determined with time.

Working viscometer: ELD type rotational viscometer (manufactured by Tokyo Keiki)

Measuring temperature: 250° C.

The retention of viscosity was represented by the following formula:

Retention of viscosity (%)=(viscosity with day/test starting viscosity)×100

The retention is preferably 100±10% or less. The determination results are shown in Table 5.

TABLE 5

| Example | Composition of organic solvents (% by weight) | | | | | | | Retention of viscosity (%) | |
|---|---|---|---|---|---|---|---|---|---|
| | DMI | PGB | MMB | Tetr | NB | Isoh | TDM | After 1 day | After 7 days |
| 14*3 | 50 | 44 | | | | | | 95 | 76 |
| 15*3 | 50 | | 44 | | | | | 96 | 71 |
| 16*3 | 50 | | | 44 | | | | 100 | 98 |
| 17*4 | 33.6 | | | | 60 | | | 99 | 92 |
| 18*4 | 33.6 | | | | | 60 | | 108 | 88 |
| 19*3 | 30 | 44 | | | | | 20 | 98 | 80 |

Tetr: Tetralin
NB: Butyl lactate
Isoh: Isophorone (the same in the following table)
TDM: Triethylene glycol monobutyl ether
*3: It was left to stand at 25° C.
*4: It was left to stand at 35° C.

Comparative Examples 13 and 14

The same procedure as in Example 14 or 17 was repeated except that the organic solvents beyond the scope of the present invention were used along with the above mother liquor 2 to obtain sample solutions for evaluating stability of viscosity. The results are shown in Table 6.

TABLE 6

| Comparative Example | Composition of solvents (% by weight) | | Retention of viscosity % | | Standing temperature |
|---|---|---|---|---|---|
| | DMI | BC | After 1 day | After 7 days | |
| 13 | 50 | 44 | 82 | 46 | 25° C. |
| 14 | 33.6 | 60 | 46 | 22 | 35° C. |

Examples 20–23 and Comparative Example 15

Using the above mother liquor 2, solvents are added to the liquor to prepare the varnish compositions containing solvents in the proportion shown in Table 7. These compositions were kept at low temperature (−40° C.), the precipitation of polyamic acid was observed, and the solubility of polymers were evaluated. The results are shown in Table 7.

TABLE 7

| | Composition of solvents | | | | | |
| --- | --- | --- | --- | --- | --- | --- |
| | DMI | PGB | MMB | Isoh | BC | Solubities |
| Example 20 | 20 | 54 | 40 | | | o |
| 21 | 34 | | 60 | | | o |
| 22 | 44 | 25 | 25 | | | o |
| 23 | 54 | | | 40 | | o |
| Comparative Example 15 | 34 | | | | 60 | x |

Examples 24–27

To the above mother liquor 2, each organic solvent within the scope of the present invention was added to obtain the compositions having the concentration shown in Table 8, and the mixture was mixed well to obtain sample liquors for evaluating coating properties.

The sample liquors were applied to glass substrates having transparent electrodes of ITO as described examples 9–12. The coated substrates were dried and heated, and the repellant properties and lack of uniformity were evaluated as described above. The results are shown in Table 8.

TABLE 8

| | Composition of organic solvents (% by weight) | | | | Lack of |
| --- | --- | --- | --- | --- | --- |
| Example | Compound name | | DMI | Repellant | uniformity |
| 24 | n-Butyl lactate | 60 | 33.6 | No | No |
| 25 | PGB | 50 | 44 | No | No |
| 26 | MMB | 50 | 44 | No | No |
| 27 | PGB + MMB | 25/25 | 44 | No | No |

Example 28 and Comparative Example 16

The same procedure as in Examples 9–13 was repeated except that the compositions were applied by a printing machine and the drying temprature after coating was 80° C. to form a coating film on substrates and treat the substrates by heating. The repellant properties and lack of uniformity were evaluated as described above. The results are shown in Table 9.

TABLE 9

| | Composition of organic solvents (% by weight) | | | | Lack of |
| --- | --- | --- | --- | --- | --- |
| | Compound name | | DMI | Repellant | uniformity |
| Example 28 | PGB + ECA | 30/50 | 15 | No | No |
| Comparative example 16 | BC | 80 | 15 | No | Found |

In addition, the composition of Comparative Example 16 precipitated a polymer in a freezer of −5° C., and the polymer was not easily dissolved on standing at room temperature. On the other hand, the composition of Example 28 did not precipitate a polymer in a freezer at −40° C.

In each of the examples NMP or DMI was used as component A, not to mention that the other compounds may be used as component A to obtain the similar effects.

As shown in the above examples and comparative examples, according to the present invention, since compounds selected from solvent components A, B and C are used as solvents, and varnish compositions containing the solvents and polyamic acid or soluble polyimide are prepared, so that it is possible to provide varnish compositions with properties such as coating properties, coating uniformity, aging, toxicity, and flammability that are improved.

I claim:

1. A varnish composition suitable for producing a liquid crystal aligning film having a thickness of several tens to one hundred nanometers comprising 1 to 10% by weight of polyamic acid or soluble polyimide, and 90 to 99% by weight of a solvent which comprises 5 to 80% by weight of at least one compound selected from a group of solvent components A and 20 to 95% by weight of at least one compound selected from a group consisting of component B and component C where the group of solvent components A consists of N-methyl-2-pyrrolidone, and dimethylimidazolidinone and the component B is alkyl lactate, and the component C is $$R_1-O(C_3H_6O)_nH \qquad (I)$$

where n is 1 or 2, $R_1$ is an alkyl group having 4 carbon atoms when n is 1, and $R_1$ is an alkyl group having 1 to 4 carbon atoms when n is 2.

2. A liquid crystal aligning film including the varnish composition of claim 1.

3. A liquid crystal display element including the liquid crystal aligning film of claim 2.

4. The varnish composition of claim 1 further including a percent retention of viscosity of 25° C. of at least 71% after 6 days.

5. A color filter protecting film including the varnish composition of claim 1.

6. A liquid crystal display element including the color filter protecting film of claim 5.

7. A liquid crystal display element including a liquid crystal protecting film and a liquid crystal aligning film, at least one of said color filter protecting film and the liquid crystal aligning film comprising the varnish composition of claim 1.

8. A varnish composition comprising:

about 33.6% by weight N-methyl-2-pyrrolidone;

about 60% alkyl lactate; and about 6.4% polyamic acid; wherein said varnish composition exhibits substantially no repelling properties at a room humidity of about 60%.

* * * * *

UNITED STATES PATENT AND TRADEMARK OFFICE
CERTIFICATE OF CORRECTION

PATENT NO. : 5,907,005
DATED      : May 25, 1999
INVENTOR(S): ITSUO SHIMIZU

It is certified that error appears in the above-identified patent and that said Letters Patent is hereby corrected as shown below:

On the title page,
In the Abstract, Item [57], line 12, change "$R_{1-O(C3H6O)_{nH}}$" to --$R_1-O(C_3H_6O)_nH$--.

Column 10, line 40, change "of" (second occurrence) to --at--;

lines 47-48, change "liquid crystal" to --color filter--.

Signed and Sealed this

Twenty-seventh Day of March, 2001

Attest:

NICHOLAS P. GODICI

Attesting Officer

Acting Director of the United States Patent and Trademark Office